(No Model.)
R. A. BREUL.
SNAP HOOK.
No. 548,694. Patented Oct. 29, 1895.
Fig. 1.
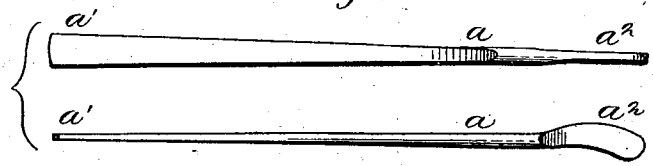
Fig. 2.
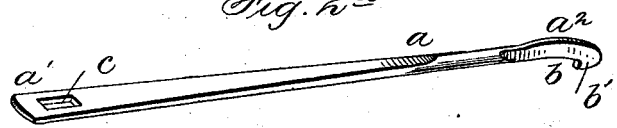
Fig. 2ª.
Fig. 3.  Fig. 4.  Fig. 5.
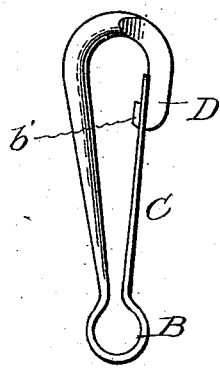 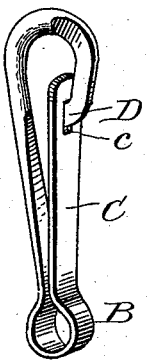 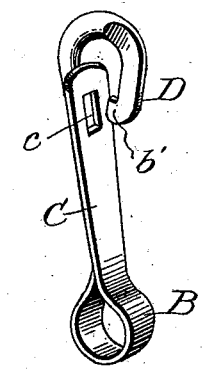
Fig. 6.  Fig. 7.  Fig. 8.
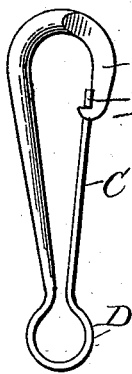  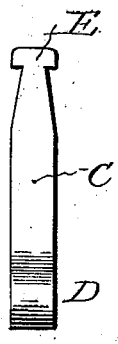
Witnesses
F. L. Ouraud.
F. T. Graham.
Inventor
Richard A. Breul.
by J. Fred Reily,
his Attorney.

UNITED STATES PATENT OFFICE.

RICHARD A. BREUL, OF BRIDGEPORT, CONNECTICUT.

SNAP-HOOK.

SPECIFICATION forming part of Letters Patent No. 548,694, dated October 29, 1895.

Application filed July 13, 1895. Serial No. 555,818. (No model.)

*To all whom it may concern:*

Be it known that I, RICHARD A. BREUL, a citizen of the United States, residing at Bridgeport, in the county of Fairfield and State of Connecticut, have invented certain new and useful Improvements in Snap-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention consists in an improved snap-hook for use in connection with halter-chains and other suitable purposes, and is especially constructed to obtain at the lowest possible expense a most compact, very serviceable, and substantial snap-hook of unquestionable security and of much greater tensile strength than has heretofore been obtained in any such device, and to employ for the construction of said snap only one piece of round wire in a single layer or thickness. As will be shown hereinafter, I have accomplished these results by flattening certain parts of the wire-blank, so as to gain strength and elasticity wherever required, and have provided for a mutual connection of the two ends of the wire, effecting such a union between these ends that the snap will in operative use virtually form a solid loop similar to a chain-link, and no strain short of the tensile strength of the weakest part of this loop can materially alter the general shape and efficacy of the snap or unbend the hooked end.

Referring to the former state of the art and to similar devices now known, my improved snap is analogous in general construction and shape to the universally-known hand-forged article appearing on the halters made of German coil-chain. This German device is bent from a flat piece of steel; but the metal is not brought into good and favorable disposition, the whole device is cumbersome, larger and heavier than necessary, rough to handle, and hard to operate on account of the unavoidable surplus of material contained therein, and also the hooked end and the loop are only held in shape and place by their own bend, which may easily be forced open or broken off. This latter defect has often attracted the attention and skill of inventors, and some American patents have been granted in which provision was made for overcoming this objection. In Patent No. 149,751, of April 24, 1874, a snap-hook is shown which is made of a sheet-metal blank. The wide spring end has a large opening through which is passed all of the hook, and the fastening of the device to a ring or other object is effected on the reverse side of the spring.

As will be shown, my snap-hook, by means of its construction and manipulation or arrangement of the wire employed for its formation, can be made from any size of material in as compact a form as any of the regular halter-snaps now in use, and with a spring action as sensitive and yielding to the touch and as positive in its return as that in any known first-class snap-hook, which are now formed with separate specially-attached springs of either flat, coiled, or other very elastic construction.

I will now proceed to describe in detail my improved snap-hook, the manipulation of the material for properly constructing the same, and the procedure and operations I use for arriving at the completely-finished article.

In the accompanying drawings, Figure 1 is a view of the original round wire-blank as cut from the wire coil. Fig. 2 shows in detail the straight swaged blank. Fig. 2ᵃ shows the same with the locking tooth and slot formed in its ends. Fig. 3 is a side view of the completed snap-hook. Fig. 4 is a perspective view of the same. Fig. 5 is a perspective side view showing the spring pressed back. Figs. 6, 7, and 8 show, respectively, a side, a front, and a detail view of the snap-hook, showing a deviation in the locking device, as hereinafter described.

In the construction of my improved snap-hook the round wire blanks A are cut from a coil of wire, and as the blank is elongated by the flattening process hereinafter described the round wire blank is cut considerably shorter—about one-fifth—than the required length of the body of the completed hook. The ends of the blank are then swaged in a cold state between suitable press or drop dies or eccentric-rolls under heavy pressure in the following manner: About two-thirds of the length of the blank are flattened out by pressure of the rolls or dies to one end—from the point a to the end a'—increasingly broadening from the width of the round stock at the point a to the end a', this broadened spring end forming the combined shank, spring-loop, and spring proper of the finished snap-hook. The other end $a^2$ of the blank is cold swaged and flattened in a plane at right angles to that of the main flattened portion a a', forming the flattened hook end, which when the two straight ends of the blank are brought together in the completed hook intersects or meets the spring end at the central line of the same and at a plane at right angles to that of said spring end. This cold swaging of the spring end a a' imparts to it a high temper, and the swaged flattened ends are then shaped for interlocking by cutting from the inner side or edge of the hook end $a^2$ a tooth-forming recess b, leaving the locking-tooth b', while a tooth-engaging slot c is cut or punched in the flat spring end a'. The blank is then bent or curved to form the spring-loop B and spring C, and, lastly, the other flattened end $a^2$ is curved to form the hook D, while the spring C is held close against the shank-body and the required adjustment given to the hook end to cause its tooth b' to exactly engage with the slot in the spring end.

In Figs. 6, 7, and 8 I have shown the body of the snap-hook formed in precisely the same way, but the spring end provided, by notching or recessing it on each side, with the locking head or end E and the end of the hook divided into a V shape, so that its extremities will engage on each side of said locking-head, as shown.

It is obvious that other styles of snaps, whether made from wire, sheet-steel, malleable iron, &c., if they embody a hook and a flat spring resting against the inner side of it, can be provided with the locking arrangement I have described; but the spirit of my present invention or a substantial part of it will be involved if a connection between the two solid and unbent ends of the hook and spring is effected by the means herein shown.

Having thus described my invention, what I claim, and desire to secure by Letters Patent, is—

1. As a new article of manfacture a snap hook made from a single piece of wire, having an increasingly broadened combined shank, spring-loop, and spring end, and a flattened hook end overlapping said spring, and means for interlocking the parallel overlapping unbent ends, substantially as set forth.

2. A snap hook made from a single piece of wire in only one layer, bent into the well known general shape shown, and formed with the broadened elastic portion comprising part of the shank, the spring-loop, and spring, and the intersecting, broadened, hook end, formed in a plane at right angles to that of the spring and having cut in its inner edge the tooth-forming recess, and a corresponding tooth-engaging slot formed in the spring, substantially as set forth.

In testimony whereof I affix my signature in presence of two witnesses.

RICHARD A. BREUL.

Witnesses:
ALFRED GRIESINGER,
FRANK SCHÄNER.